March 15, 1949.  L. VANLEIRSBERGHE  2,464,621
JACK TYPE TIRE REMOVING TOOL
Filed Aug. 27, 1945
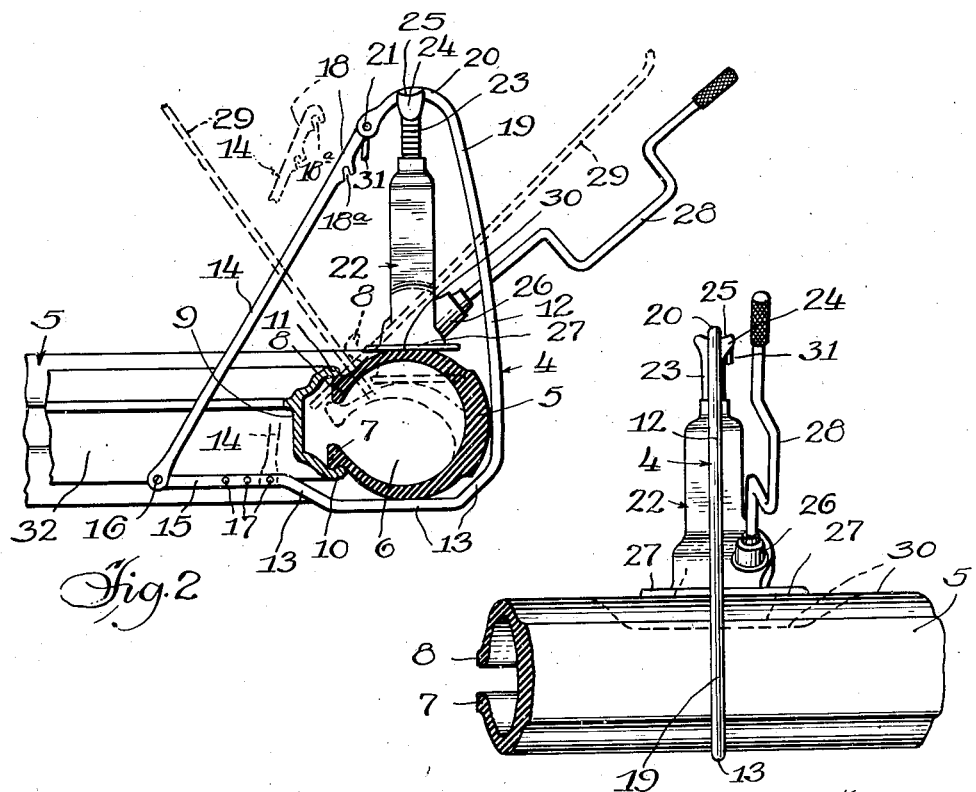
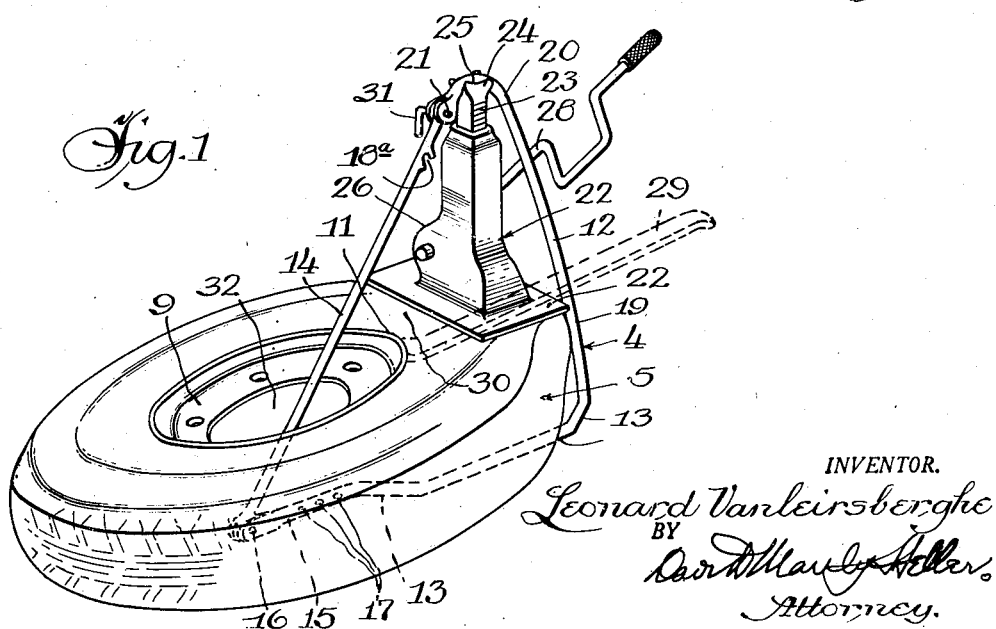
INVENTOR.
Leonard Vanleirsberghe
BY
Attorney.

Patented Mar. 15, 1949

2,464,621

UNITED STATES PATENT OFFICE 2,464,621

JACK-TYPE TIRE REMOVING TOOL

Leonard Vanleirsberghe, La Grange Park, Ill.

Application August 27, 1945, Serial No. 612,753

1 Claim. (Cl. 157—1.26)

My instant invention relates to tools for removing tires from rims.

It is a specific object of my invention to use an automobile jack in connection with the removal of tires from rims.

An important object of my invention is to provide a triangulated fixture which is associated with an ordinary automobile jack structure, the combination serving ideally for adaptation to removal of tires from vehicle wheels.

Another object of my invention is to provide in a tool of the aforementioned character, a triangulated fixture which has an articulate rod connected thereto adapted to be passed through the central hub opening in a wheel structure and adapted to be releasably secured to the upper portion of the triangulated fixture.

A further object of my invention is to provide an instrumentality of the aforementioned character which is practical in its construction, efficient in the uses to which it may be applied, and a structure which is economical to manufacture in quantity production.

Other features, objects and advantages inherent in my invention will become apparent, and be best understood by reference to the accompanying drawings, taking into consideration the ensuing description for the proper interpretation thereof, the said description embracing numerical designations for the respective parts, like symbols in the various views denoting like parts and, in which:

Fig. 1 represents a perspective view of a tire and rim assemblage with my invention secured thereto preparatory to removal of the tire from the rim.

Fig. 2 is a transversal cross-sectional view showing the relationship of the structural units used in the tire removal operation; and Fig. 3 is a right end view of Fig. 2, showing a fractional part of the tire, and the conditions under which a prying lever type of tool may be used to remove the tire from the rim.

Referring to the various views, it will be noted that my invention consists of a triangulated structure, generally, designated 4 and a jack structure, generally, designated 22. The triangular structure consists of a side 19, a bottom cradled out portion 13, having an arm extension 15, to which is articulately secured at 16 the pivotally operable lever 14. The end of this lever 14 is provided with a series of locking notches 18a which engage the fastening 21 provided with a handle 31 for locking the lever 14 into triangulated engagement to the arcuate portion 20, thus forming a rigid construction. The jack structure 22 has secured to its body the lifter element 23, having the end locating portion 24 which may be suitably formed with a concave portion 25 in order to locate and confine the cylindrical section 20 of the fixture 12. The said jack is provided with a wide and long base of suitable area 27, as is customarily provided to insure stability for such jacks, and it may be provided with an angular hub portion 26 whereby the manipulating lever 28 may be inserted to engage a suitable gearing mechanism for raising or lowering the lifter element 23. The tire structure, generally, designated 5 is usually mounted on a rim 9, which is provided with flange portions 10, and 11, which confine in engagement the lips 7 and 8 firmly and rigidly when the tire tube (not shown) is inflated causing the inner recess 6 of the tire to be held under rigid inflational support. The triangulated structure 12, it will be noted, may be provided with a series of other drilled openings 17 to receive the pivot pin 16, enabling the lever 14 to be positioned in a different triangulated formation which may vary with the type of rim used to hold tires.

In the actual operation of the removal of a tire, the rim and tire assemblage is placed in relationship to the structural unit comprising my invention as indicated in Figure 2 and Figure 1, namely, the tire tube is first deflated so that the tire will be under normal pressure, at which time the locking latch 31 is loosened so as to permit the lever 14 to be separated therefrom and inserted through the central opening 32 in the rim, the tire 5 being suitably located and cradled within the portion 13. The lever 14 has its latching portion 18 brought into engagement with the latching pin 21 and the latch lock 31 operated so as to lock the triangulated fixture 12 firmly. The jack 22 is then positioned on the top portion 30 of the tire 5, so that its base 27 straddles a portion thereof. At this time the lifter element 23 should be in a position lower than the inner portion of the arcuate portion 20 of the triangulated structure 12, and the lifter element 23 should also be directly below it, with the concave portion 25 ready to engage the underneath portion of the arcuate portion 20 when elevated to the proper height. The handle element 28 is then rotated in the proper direction to elevate the lifter element 23 causing the concave portion 25 to locate and seat therein the arcuate portion 20. The operation of the lifter element is continued and inasmuch as the rigid triangulated structure 12 will not yield, the base 27 is caused to be depressed to the dotted lines shown, causing the portion 30 of the tire 5 to be depressed freeing the lips 8 from the flange 11 to a sufficient distance to permit the tool or lever 29 to be inserted therein and rotated through the angular position indicated in Figure 2 causing the said lip 8 to be brought up above the flange 11, thus freeing a portion of the tire from the rim. The tool or instrumentality may be moved about the tire and the operation repeated two or three times if necessary until a large enough lip portion 8 of the tire periphery has been freed in order to permit removal thereof from the rim.

The foregoing objects and advantages to be derived from the simple tool comprising my invention are that only a triangulated structure need be furnished to perform the results needed, inasmuch as a tire jack is the standard equipment that is furnished with all automobiles or vehicles.

I believe, that I have described rather succinctly the nature and the construction as well as the operation of my invention, and inasmuch as the same is susceptible of modification, I hereby reserve the right to all modifications falling within the spirit and scope of my invention, as well as those embraced in the accompanying drawings, and also those falling within the purview of the foregoing description.

Having thus described and revealed my invention, what I claim as novel, and desire to secure by Letters Patent, is:

In an instrumentality of the character described, triangulated fixture means made of rigid elements comprising, an angular frame-work forming a rigid base and altitude lateral component of the said triangulated fixture means, the said altitude lateral being provided with a downwardly bent portion at its terminus to form a seat for the end of jack elevator means, another lateral component of the said triangulated fixture means being pivotally connected to one end of the said base and releasably attachable to the end of the said bent portion resulting in triangulated fixture means susceptible of application to any radial section of a tire and rim assembly.

LEONARD VANLEIRSBERGHE.

REFERENCES CITED

The following references are of record in the file of this patent:

UNITED STATES PATENTS

| Number | Name | Date |
|---|---|---|
| 1,137,555 | Turnbull | Apr. 27, 1915 |
| 1,177,592 | Beebe | Apr. 4, 1916 |
| 1,983,608 | Hand | Dec. 11, 1934 |
| 2,010,713 | Countryman | Aug. 6, 1935 |
| 2,217,139 | Smith | Oct. 8, 1940 |
| 2,418,849 | Polt | Apr. 15, 1947 |